United States Patent

Tateisi et al.

[11] 4,011,433
[45] Mar. 8, 1977

[54] VALUE DISPENSING SYSTEM

[75] Inventors: Kazuma Tateisi, Kyoto; Sizuka Horii, Nagaokakyo; Yasuo Uchida, Takatsuki, all of Japan

[73] Assignee: Omron Tateisi Electronics Co., Kyoto, Japan

[22] Filed: Jan. 27, 1975

[21] Appl. No.: 544,215

[30] Foreign Application Priority Data

Feb. 1, 1974 Japan .............. 49-13793

[52] U.S. Cl. .............. 235/61.7 B; 194/DIG. 26; 340/149 A

[51] Int. Cl.² .................. G06K 7/01

[58] Field of Search ........... 194/4 R, DIG. 26; 235/61.7 B; 340/149 A, 152 R

[56] References Cited

UNITED STATES PATENTS

| | | | |
|---|---|---|---|
| 3,308,439 | 3/1967 | Tink et al. | 235/61.7 B X |
| 3,559,175 | 1/1971 | Pomeroy | 235/61.7 B X |
| 3,634,656 | 1/1972 | Krechmer | 235/61.7 B |
| 3,648,020 | 3/1972 | Tateisi et al. | 194/DIG. 26 |
| 3,665,161 | 5/1972 | Oberhart | 340/149 A X |
| 3,719,927 | 3/1973 | Michels et al. | 340/152 R X |
| 3,824,375 | 7/1974 | Gross et al. | 235/61.7 B |
| 3,833,885 | 9/1974 | Gentile et al. | 340/149 A X |
| 3,849,968 | 11/1974 | Tateisi | 194/4 R X |

*Primary Examiner*—Drayton E. Hoffman
*Assistant Examiner*—Charles A. Marmor
*Attorney, Agent, or Firm*—Christensen, O'Connor, Garrison & Havelka

[57] ABSTRACT

An automatic monetary value dispensing system wherein a card previously issued to each customer having an account therein is used to actuate the system. The card has recorded thereon necessary data such as the identification number and the current off-line balance of the account, with the on-line balance thereof being recorded in a central processing unit. Dispensation of the requested amount of value is determined by comparing the amount with the on-line and off-line balances of the account.

15 Claims, 3 Drawing Figures

VALUE DISPENSING SYSTEM

This invention relates to a system for automatically dispensing value and more particularly to such a system which selectively works as an on-line and an off-line system.

A typical example of such a system is a cash dispensing system. Two types of cash dispensers are widely used. One is the on-line type which is directly connected to a central processing unit (to be referred to as the CPU hereinafter), while the other is the off-line type which is not controlled by the CPU, but in which necessary information is stored in a suitable recording medium such as a card.

In the on-line system, when a customer wishes to withdraw cash from the dispenser, the current balance in his or her saving account can be instantly known, so that a payment is made within the limits of the current balance. In other words, with the on-line system it is possible to always withdraw from the updated balance. This is one advantage of the on-line system. However, the CPU in a banking system rests at night and on holidays due to the reduced working efficincy of the CPU, so that customers cannot use the system at night of on holidays. This certainly is very inconvenient to the customers.

In the off-line system, each cash dispenser operates independently of the others so that there is no limitation on its working time or location, but it can stand operative at night or on holidays and be installed at various places such as buildings, offices, amusement centers, etc. This is quite convenient to customers. However, since the off-line dispenser is independent from the CPU, it is impossible for a customer to withdraw from his or her savings account in the on-line system. This is very unreasonable. In the off-line system, payment is made only within the limits of the monetary value recorded on the card each customer has for the purpose.

As mentioned above, both the on-line and the off-line dispensers have their own merits and demerits. There have been proposed no system which can operate in both on-line and off-line modes, so that people are compelled to open two accounts in both on-line systems and inconveniently have two cards for the two systems.

In order to overcome the above disadvantage a system has been proposed, wherein a single cash dispenser is so designed as to perform on-line and alternatively off-line functions, with a single card being used to actuate the dispenser. On the card there is recorded necessary information or data including at least the account number and the current balance of the account (to be referred to as the off-line balance hereinafter). When the system operates in on-line mode, the account number recorded on the card is read to address the corresponding account in the CPU so that payment is made within the current balance of the account (to be referred to as the on-line balance). At night and on holidays or when the CPU is out of order, the system is switched from the on-line to the off-line mode of operation.

The above system, however, has the following defects: Suppose that the amount of money the customer wishes to withdraw happens to be more than the on-line balance but less than the off-line balance. If the system operates in on-line mode, no money is paid to the customer because the on-line balance is short of the amount it is requested to withdraw. This is unreasonable since the off-line balance is sufficient for payment of the requested amount. The customer must wait until the system is switched to the off-line mode if he wishes to acheive the intended withdrawal.

On the contrary, if the amount to be withdrawn is more than the off-line balance but less than the on-line balance, and if the system operates as an off-line system, no payment is made, so that the customer must wait until the system is switched to the on-line mode.

Accordingly, one object of the invention is to provide a system for dispensing a monetary value in which dispensation of the value is determined on the basis of both the on-line and the off-line balances.

Another object of the invention is to provide such a system as aforesaid, wherein the amount of value to be dispensed is checked up first with either one of the on-line balance and the off-line balance, and if that one balance is short of the amount of value to be dispensed, dispensation of the requested amount of value is determined on the basis of the other balance.

Another object of the invention is to provide such a system as aforesaid, wherein the amount of value to be dispensed is checked up first with the on-line balance and if the balance is short of the amount of value to be given, dispensation of the requested amount of value is determined on the basis of the off-line balance.

Another object of the invention is to provide such a system as aforesaid, wherein a card on which the identification number and the current off-line balance of the account of the card owner are recorded is used in such a manner that the amount of value to be dispensed is checked up with the current on-line balance of the account which is stored is a storage in the system and to which access is made by the identification number of the card, and if the on-line balance is less than the amount of value to be dispensed, dispensation of the amount to be dispensed is determined on the basis of the off-line balance of the account.

Another object of the invention is to provide such a system as aforesaid, wherein it is possible to dispense a monetary value within the limits of the sum of the on-line balance and the off-line balance. To this end, the system of the invention is provided with means for indicating the current on-line and off-line balances. When the system operates in on-line mode, it dispenses an amount of value within the limits of the on-line balance, and if the on-line balance is short of the amount to be dispensed, the system is automatically switched to the off-line mode of operation so that dispensation of value is conducted within the limits of the off-line balance.

Another object of the invention is to provide an automatic deposit withdrawing system for use in banks and other similar establishments, which includes cash dispensers which work selectively as an on-line and an off-line system. If the on-line balance of a customer's account is short of the amount he wishes to withdraw, the system is automatically switched from the on-line to the off-line mode of operation.

In the deposit withdrawal system embodying the invention, a card is previously issued to each customer who is registered in the system. The card has recorded thereon necessary information such as the identification number and the off-line balance of the savings account of the customer. When the card is used in the cash dispenser, the machine reads the account number on the card and sends the number and the amount to be withdrawn onto a central processing unit (CPU). In the CPU access is made to the current on-line balance of the account corresponding to the read account number, and the amount to be withdrawn is compared with the on-line balance. If the former is equal to or less than the latter, the requested amount of cash is dispensed. So far the system operates in the same manner as in the prior art.

However, if the amount to be withdrawn exceeds the current on-line balance, the CPU sends a dispensation inhibition signal to the terminal cash dispenser, which then is automatically switched from the on-line to the off-line mode of operation. In the off-line mode, the amount to be withdrawn is compared with the current off-line balance read from the card. If the latter equals or exceeds the former, the requested amount of cash is dispensed, and the amount dispensed is subtracted from the off-line balance so that the result of subtraction is recorded on the card as the new off-line balance.

If the off-line balance is less than the amount to be withdrawn, no money is dispensed.

It may happen than both the on-line balance and off-line balance individually are short of the amount to be withdrawn, but the sum of the two balances equals or exceeds the amount to be withdrawn. In such a case, if the withdrawal is refused, it would be quite unreasonable. In accordance with the invention, the current on-line and off-line balances are indicated, so that the customer first makes a demand on the dispenser for dispensation of an amount equal to the on-line balance. When the amount of cash has been dispensed, he next makes a demand for payment of the amount equal to the difference between the total amount the customer wishes to withdraw and the amount that has been dispensed by the first operation. Since there is no on-line balance left, the system is automatically switched to the off-line mode and the amount of cash equal to the above-mentioned difference is dispensed within the limits of the off-line balance on the card. The sum of these two amounts will be equal to the amount the customer wished to withdraw.

The invention will be described in more detail with reference to the accompanying drawings, wherein.

Figure 1:
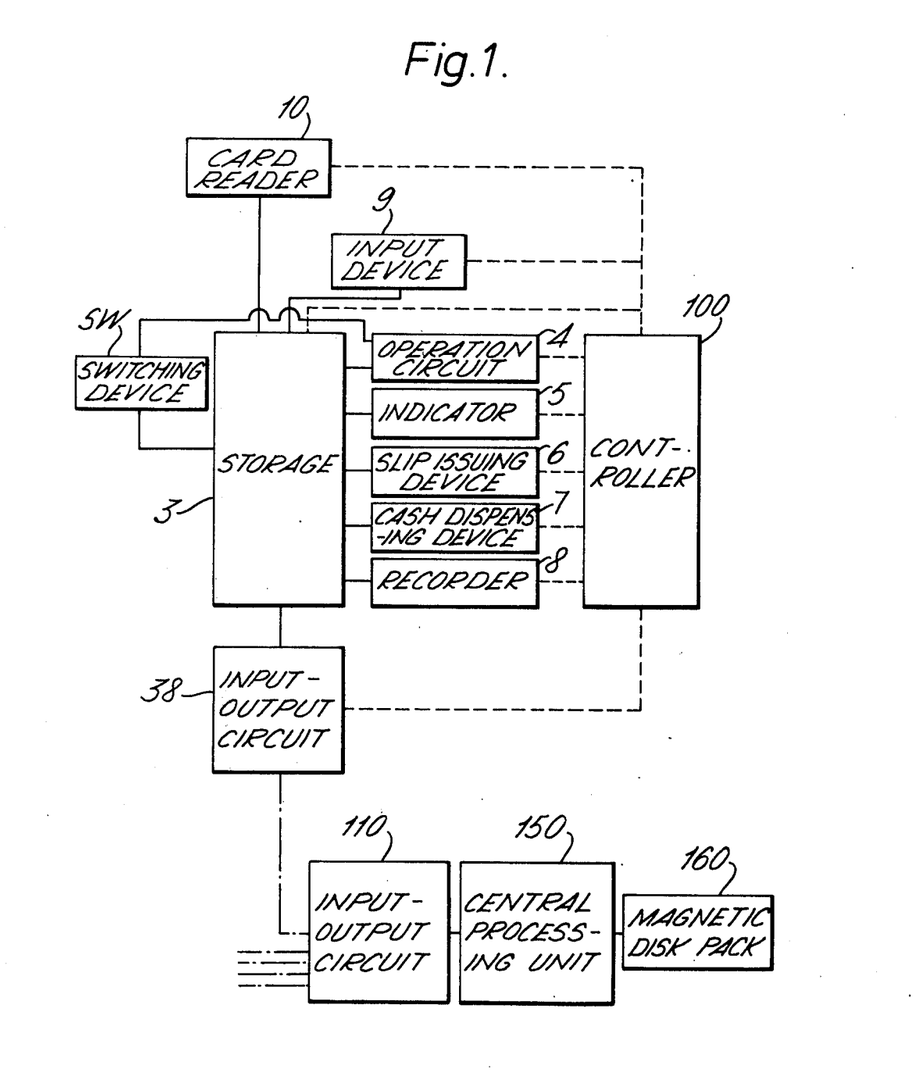
FIG. 1 is a general layout of the whole system of the invention.

Referring to the drawings, first to FIG. 1, a cash dispenser comprises various component parts shown as blocks 3 through 10, 38 and 100. A customer puts his or her card into a slot (not shown) provided on the front panel of the machine housing. The card has magnetically recorded thereon necessary information including at least the account number, the off-line balance and the secret number, and if necessary, other data such as the term of availability of the card, the latest data on which the card was used, etc. The data on the card is read by a card reader 10 and then stored in a storage 3.

An indicator 5 indicates that the customer should now input his memory number into the machine. He then operates an input device 9 to enter the secret number into the machine. This entry is also stored in the storage 3. A comparator 4 compares the secret number read from the card and the memory number entered through the input device and if the two numbers disagree, the card is returned. If they agree, the indicator 5 indicates that the customer should now enter the amount he wishes to withdraw from his savings account. The amount entered through the input device 9 is stored in the storage 3.

A switching device SW is manually operable and is so designed as to be operative when the dispenser operates in off-line mode and kept inoperative when it operates in on-line mode.

Suppose that the dispenser now operates in on-line mode. The account number and the amount to be withdrawn as stored in the storage 3 are transmitted through input-output circuits 38 and 110 to a central processing unit (CPU) 150.

A magnetic disk pack (DPU) 160 which is a subsidiary storage is addressed by the account number included in the data transmitted from the terminal dispenser in the above manner. The DPU stores the account numbers and the corresponding on-line balances of the savings accounts of all the customers in the system. The on-line balance of the particular account addressed by the account number is compared in the CPU 150 with the amount it is requested to withdraw from the account, and if the balance is more than the requested amount, the latter amount is subtracted from the balance and the new balance is recorded in the DPU 160. At the same time the CPU sends to the terminal machine a message to permit payment of the requested amount of money. Upon receipt of the message, a controller 100 operates a slip issuing device 6, a cash dispensing device 7 and a recorder 8 thereby to dispense cash together with a transaction slip and record necessary data. It should be noted that in the on-line operation the off-line balance on the card is not rewritten.

If the CPU 150 has found that the on-line balance is less than the amount to be withdrawn, the CPU transmits to the terminal dispenser a message to inhibit the requested payment. Upon receipt of the message, the controller 100 switches the dispener from the on-line to the off-line mode of operation by rendering the device SW operative, whereupon the off-line balance and the amount to be withdrawn are transmitted to an operation circuit 4 where the two values are compared.

If the off-line balance is less than the amount to be withdrawn, the withdrawal is refused and the card is returned to the customer. If the off-line balance is equal to or more than the amount to be withdrawn, the controller 100 controls the devices 6, 7 and 8 to dispense cash and a slip and record the payment made in the off-line mode switched from the on-line mode. The operation circuit 4 subtracts the amount withdrawn from the off-line balance and transmits the new off-line balance to the storage 3 to be stored therein. The new off-line balance is sent to the card reader 10. The old off-line balance on the card is rewritten and the card with the new off-line balance thereon is then returned to the owner.

Figure 2:
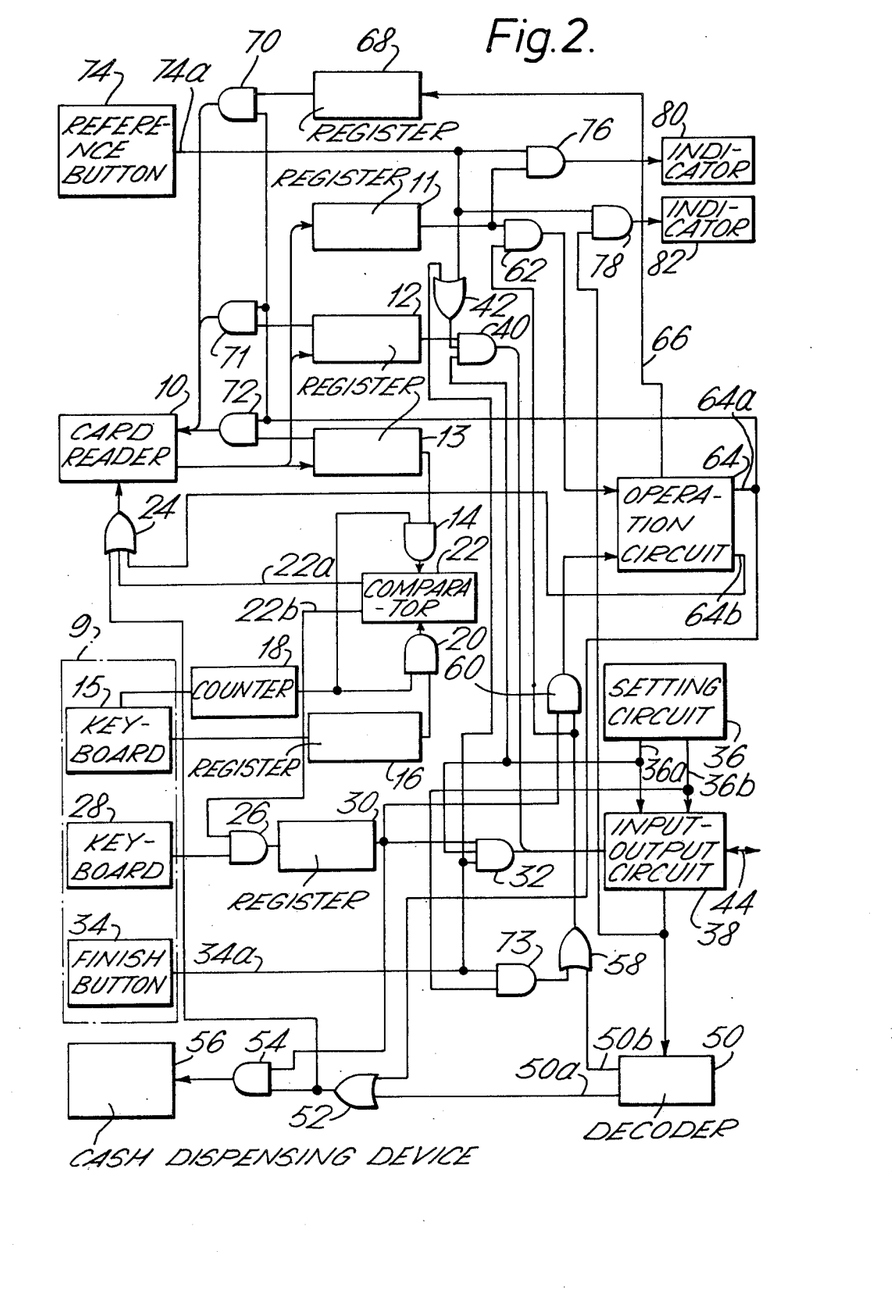
FIG. 2 is a detailed circuit diagram of the dispenser in the system of FIG. 1.

The arrangement and operations of the system of the invention will be described in more detail with reference to FIGS. 2 and 3.

As previously mentioned, the card reader 10 reads the data on the card inserted into the cash dispenser. The off-line balance included in the read data is stored in a register 11; the account number, in a register 12; and the secret number, in a register 13. If the card has other data recorded thereon such as the term of availability, a suitable device also checks such other data and if the card is recognized as improper, it is returned to the customer. The output from the register 13 is applied as one input to an AND element 14.

The customer then enters the memory number into the machine through the input device 9 which comprises a keyboard or dial 15 for entering the memory number, a keyboard or dial 28 for entering the amount to be withdrawn and a finish button 34.

The memory number entered through the keyboard 15 is stored in a memory number register 16 on the one hand and on the other causes a counter 18 to produce an output when the memory number has been keyed in. The output from the counter 18 is applied to AND elements 14 and 20.

A comparator 22 compares digit the secret number read from the card and stored in the register 13 and the memory number entered through the keyboard 15 and stored in the register 16. If the two numbers disagree, the card is recognized as not belonging to the person who has inserted it into the machine, and the comparator 22 produces a disagreement signal on a line 22a. The signal is applied as one input to an OR element 24, the output from which is applied back to the card reader 10 to return the card to the customer.

If the two numbers agree, the comparator 22 produces an agreement signal on a line 22b, which is applied as one input to an AND element 26.

The agreement signal actuates the indicator 5 to indicate that the customer should now enter the amount he wishes to withdraw from his account. He then operates the keyboard 28 accordingly and the entered data is applied as the other input to the AND element 26 and stored in a withdrawal amount register 30, the output from which is applied as one input to an AND element 32.

When the amount to be withdrawn has been entered, the customer pushes the finish button 34, whereupon a signal is produced on a line 34a to be applied as one input to an AND element 73.

Selection between the on-line and off-line modes of operation of the system is made by a setting circuit 36 which is manually operable to normally set the system to the on-line mode of operation. Under the condition, the circuit 36 produces an on-line mode signal on a line 36a, which is applied as a second input to the AND element 32. When the system is switched to the off-line mode, the circuit 36 produces an off-line mode signal on a line 36b.

The signal produced on the line 34a when the finish buttons has been pressed is applied as the third input to the AND element 32, so that the amount to be withdrawn as stored in the register 30 is sent to the input-output circuit 38.

The account number read from the card and stored in the register 12 is transmitted as one input to an AND element 40, to which the signal on the line 34a is applied as a second input through an OR element 42, and the on-line mode signal on the line 36a is applied as the other input to the AND element 40, so that when the finish button 34 has been pressed, the account number stored in the register 12 is sent to the input-output circuit 38.

Figure 3:
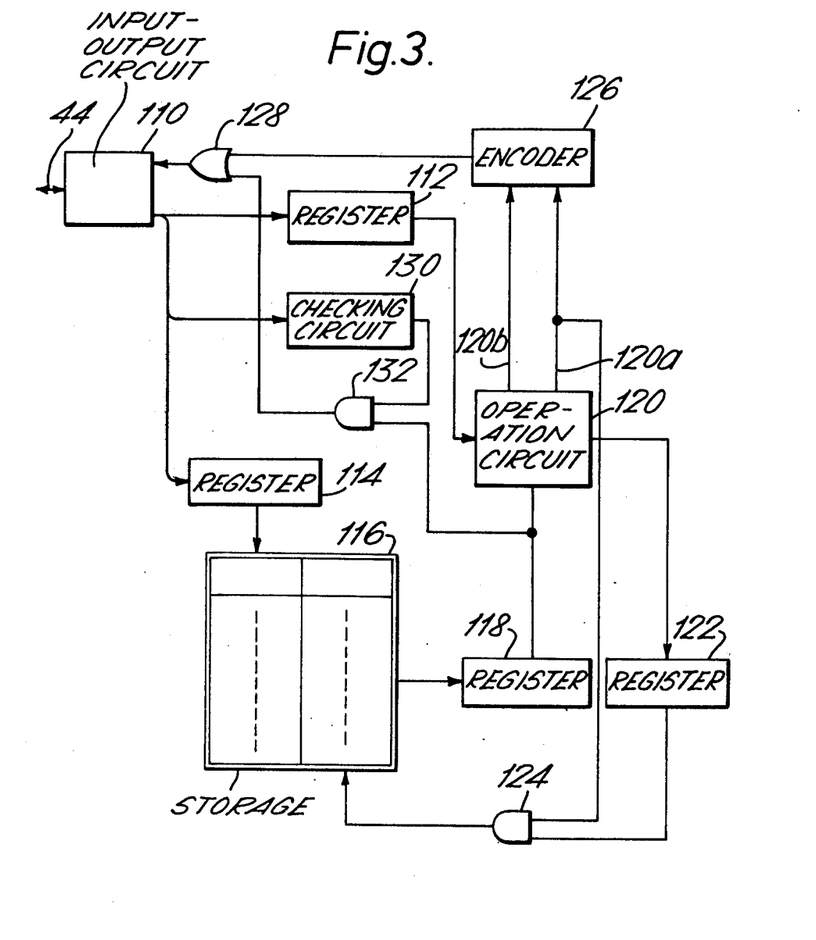
FIG. 3 is a detailed circuit diagram of the central processing unit in the system of FIG. 1.

The circuit 38 transmits the account number and the amount to be withdrawn through a line 44 to the central processing unit (CPU), the details of which are shown in FIG. 3.

In the CPU, the input-output circuit 110 receives the data sent from the terminal machine, and sends the amount to be withdrawn to a register 112 to be stored therein and the account number to a register 114 to be stored therein.

A storage 116 stores the account numbers of all the customers registered in the system and the current on-line balances of their corresponding accounts. The storage may comprise a magnetic disk pack and constitutes what is commonly referred to as the ledger file. In addition to the on-line balances, the storage may store the off-line balances which are updated by a batch process.

By the account number stored in the register 114 access is made to the corresponding on-line balance, which is stored in a register 118. The values stored in the registers 112 and 118, that is, the amount to be withdrawn and the current on-line balance of the customer's account are compared by an operation circuit 120. If the latter value is equal to or greater than the former value, the circuit 120 produces a permission output signal on a line 120a to permit dispensation of the requested amount of cash. If the latter value is smaller than the former value, the circuit 120 produces an inhibition output signal on a line 120b.

In the former case, that is, when the current on-line balance is equal to or greater than the amount to be withdrawn, the circuit 120 operates to subtract the latter from the former value, and the result of subtraction, that is, the new on-line balance is stored in a register 122. The value stored in the register is applied as one input to an AND element 124 to which the output signal on the line 120a is applied as the other input, so that the old balance in the storage 116 is replaced by the new balance stored in the register 122.

The signals on the lines 120a and 120b are applied to an encoder 126, and the coded signals are sent through an OR element 128 to the input-output circuit 110, which in turn sends the received data to the terminal dispenser through the line 44.

At the dispenser, upon receipt of the signal received through the line 44 from the CPU, the input-output circuit 38 transmits the received signal to a checking circuit or decoder 50, which checks whether the signal is the permission signal on the line 120a or the inhibition signal on the line 120b. If it is recognized as the permission signal, the circuit 50 produces an output on a line 50a, while if it is recognized as the inhibition signal on the line 120b, the circuit 50 produces an output on a line 50b.

The signal on the line 50a is applied as one input to an AND element 54 through an OR element 52. The amount to be withdrawn as stored in the register 30 is applied as the other input to the AND element 54, which produces an output to actuate a cash dispensing device 56 to dispense the requested amount of cash out through an outlet provided for the purpose on the front panel of the machine.

The output from the OR element 52 is also applied to the OR element 24, the output from which actuates the card reader 10 to return the inserted card to the customer.

The information stored in the register 30, that is, the amount to be withdrawn is applied as one input to an AND element 60. The signal on the line 50b, which means that no payment is allowed from the on-line balance, is applied as the other input to the AND element 60 through an OR element 58, whereupon the amount to be withdrawn is transmitted to an operation circuit 64.

The data stored in the register 11, that is, the off-line balance read from the card is applied as one input to an AND element 62, to which the signal on the line 50b is applied as the other input, so that the off-line balance is transmitted to the operation circuit 64.

The operation circuit 64 compares the two inputs from the AND elements 60 and 62, and if the off-line balance equals or exceeds the amount to be withdrawn, the circuit 64 produces an output signal on a line 64a, while if the former is less than the latter, the circuit 64 produces an output signal on a line 64b.

In the former case, that is, when the off-line balance is equal to or more than the amount to withdrawn, the circuit 64 subtracts the latter from the former amount and the result of the subtraction, that is, the new off-line balance is sent to a register 68 to be stored therein. The new off-line balance stored in the register 68 is applied as one input to an AND element 70. The account number and the secret number stored in the registers 12 and 13 are applied as one input to AND elements 71 and 72, respectively. The output produced by the operation circuit 64 on the line 64a is applied as the other input to the AND elements 70, 71 and 72, whereupon the AND elements produce an output to be applied to the card reader 10, which then rewrites the old to the new off-line balance on the card. The output on the line 64a from the operation circuit 64 is also applied through the OR elements 52 and 24 to the card reader 10 to actuate the same to return to the customer the card with the data rewritten thereon.

When the cash dispenser operates in off-line mode from the start, the setting circuit 36 produces an output on the line 36b. This signal is applied as one input to the AND element 73, to which the signal from the finish button 34 is applied as the other input, so that the AND element 73 produces an output. The ensuing operation of the network is the same as when the checking circuit 50 produces an output on the line 50b, so that the requested amount of cash will be or will not be paid and the card is returned to the customer.

When the customer wishes to known the current off-line and on-line balances of his savings account, he puts his card into the machine and presses a reference button 74, whereupon a signal appears on a line 74a to be applied as one input to AND elements 76 and 78 and also to the OR element 42. The off-line balance read from the card and stored in the register 11 is applied as the other input to the AND element 76, so that the balance is indicated by an off-line balance indicator 80.

The output of the OR element 42 is applied as one input to the AND element 40, to which the account number from the register 12 and the on-line mode signal on the line 36a from the setting circuit 36 are applied as the other inputs, so that the AND element 40 transmits the account number and the signal on the line 74a to the input-output circuit 38 and thence onto the CPU through the line 44.

In the CPU, the data sent from the circuit 38 is received by the input-output circuit 110 and the reference signal on the line 74a contained in the data is checked by a checking circuit 130. When the circuit 130 recognizes the signal, it produces an output to be applied as one input to an AND element 132.

The account number contained in the received data is stored in the register 114, so that access is made to the corresponding one of the accounts stored in the storage 116 and the on-line balance of that account is read out to be stored in the register 118. The output from the register 118 is applied as the other input to the AND element 132, so that the read out on-line balance is sent from the AND element 132 through the OR element 128, the input-output circuit 110 and the line 44 to the input-output circuit 38 of the terminal cash dispenser.

The circuit 38 transmits the received data to an on-line balance indicator 82 through the AND element 78, so that the current on-line balance of the customer's account is indicated by the indicator 82.

If the customer wishes to withdraw an amount which is more than the on-line balance but less than or equal to the sum of the on-line balance and the off-line balance, he presses the reference button 74 to know his current on-line and off-line balances indicated by the indicators 80 and 82, respectively. The customer has in mind what amounts are to be withdrawn from his on-line and off-line accounts, respectively, in order to obtain the total amount he requires.

Then, first he enters into the keyboard 28 the first amount to be withdrawn from the on-line balance, so that, as previously mentioned, the operation circuit 120 in the CPU produces a permission signal on the line 120a and the dispensing device 56 dispenses cash corresponding to the first amount to be withdrawn from the on-line balance. Next, he enters again into the keyboard 28 the second amount to be withdrawn from the off-line balance. Since this second amount is more than the new on-line balance resulting from the withdrawal of the first amount from the on-line balance, the operation circuit 120 produces a payment inhibition signal on the line 120b, whereupon the checking circuit 50 produces an output on the line 50b, whereupon the cash dispenser is switched from the on-line to the off-line mode of operation.

Since the second amount to be withdrawn from the off-line account is less than the current off-line balance, the dispensing device 56 dispenses cash corresponding to the second amount in the previously mentioned manner.

Thus it is possible for the customer to receive payment of a greater amount of cash than each of the on-line and off-line balances within the limits of the sum of the two balances.

In order to eliminate the reference operation, the arrangement may be such that in the CPU the amount to be withdrawn is compared with the current on-line balance, and the amount resulting from subtraction of the latter from the former is sent to the terminal dispenser, in which this amount is compared with the current off-line balance and when the balance is more than that amount, payment of that amount is allowed. In this case, however, it is necessary to rewrite or update both the on-line and off-line balances.

In the illustrated embodiment, the CPU produces a payment permission signal if the on-line balance is equal to or more than the amount to be withdrawn. If a predetermined balance must always be kept in the customer's account for payment of public fees such as taxes, the CPU may be so arranged as to produce a payment inhibition signal if the result of subtraction of the amount to be withdrawn from the on-line balance is short of the above-mentioned predetermined amount to be kept for payment of public fees.

In the illustrated embodiment, the system includes a single terminal dispenser, but in practice a plurality of cash dispensers are connected to the CPU.

At night or on holidays the system is either manually or automatically switched from the on-line to the off-line mode of operation. Also, when a trouble has occurred to the CPU or the associated circuits, the system may be automatically switched to the off-line mode of operation.

In the foregoing the invention has been described as applied to a system for withdrawing cash from savings accounts. it is also applicable to systems for giving credits or cash loans, or vending articles, or services by POS (point of sales) terminal machines.

What we claim is:

1. A system for automatically dispensing value, wherein a card for actuating said system is previously issued to each customer having an account in the system, the current status of said account being characterized by a current on-line balance and a current off-line balance, one of said current on-line balance and said current off-line balance being changed each time said system dispenses value to supply a new current off-line balance and a new current on-line balance representative of the status of said account after said value is dispensed, each said card having recorded thereon necessary data including at least the identification number and said current off-line balance of said account, said system comprising: means for reading said data recorded on said card; value setting means for setting an amount of value to be dispensed; means for storing said current on-lien balance of the account of each said customer; first comparison means for determining whether said amount is to be dispensed by comparing said amount with said current on-line balance to which access is made by said identification number of said card read by said reading means; second comparison means for determining whether said amount is to be dispensed by comparing said amount with said current off-line balance, said second comparison means being operable in response to a control signal; first control means responsive to said first comparison means for supplying said control signal to render said second comparison means operative whenever said first comparison means determines said amount is not to be dispensed on the basis of said comparison of said amount with said current on-line balance; and dispensing means for dispensing value equivalent to said amount of value established by said value setting means, said dispensing means responsive to said first comparison means to dispense said value when said first comparison mans determines said amount does not exceed said current on-line balance, said dispensing means responsive to said second comparison means to dispense said value when said second comparison means determines said amount does not exceed said current off-line balance.

2. The system of claim 1, further including means for enabling said customer to operate said system to dispense an amount exceeding said current on-line balance, said means including means for indicating both said current off-line and said current on-line balances.

3. The system of claim 1 wherein said storing means comprises a storage for storing said current on-line balance and subtraction means operable in response to said first comparison means to change said current on-line balance in said storage to said new current on-line balance, said first comparison means rendering said subtraction means operable whenever said first comparison means determines said amount is to be dispensed, said subtraction means subtracting said amount to be dispensed from said current on-line balance to determine said new on-line balance.

4. The system of claim 1, wherein said reading-means includes subtraction means operable in response to said second comparison means to change said current off-line balance on said card to said new current off-line balance said second comparison means rendering said subtraction means operable whenever said second comparison means determines said amount is to be dispensed, said subtraction means subtracting said amount to be dispensed from said current off-line balance to determine said new current off-line balance.

5. The system of claim 1, wherein said account is a savings account in a banking system and said value dispensed by said dispensing means is an amount of cash to be withdrawn from said savings account.

6. The system of claim 5, wherein said reading means, said value setting means, said second comparison means and said dispensing means are physically contained in a terminal cash dispenser; and said storing means, said first control means and said first comparison means are physically contained in a remotely located central processing unit, said value setting means including means for supplying a signal representative of said amount of value to be dispensed and said first comparison means including means for supplying a signal whenever said first comparison means determines said amount of value set by said value setting means does not exceed said current on-line balance, said system further comprising connection means for connecting said terminal cash dispenser to said central processing unit, said connection means including means for coupling said signal representative of said amount of value to be dispensed from said value setting means to said first comparison means, means for coupling said control signal from said first control means to said second comparison means, and means for coupling said signal from said first comparison means to said dispensing means whenever said first comparison means determines said amount of value set by said value setting means does not exceed said current on-line balance.

7. The system of claim 6 wherein a plurality of cash dispensers are connected to a single one of said central processing units by said connection means.

8. The system of claim 5 further comprising second control means including a manually operable switch, said second control means rendering said second comparison means operable when said manually operable switch is placed in a predetermined position, said second control means for rendering said second comparison means operable during periods of time in which said system is to dispense said amount solely on the basis of said current off-line balance.

9. A value dispensing system wherein the maximum value to be dispensed in any one transaction is limited by an on-line and an off-line balance of a customer having an account in the system, said system operable to dispense a requested value in response to a previously issued card having stored thereon data including at least the customer's identification number and the customer's off-line balance, said system comprising:

a central processing unit including storage means responsive to a signal representative of said identification number for determining said on-line balance, said storage means for supplying a signal representative of said on-line balance, first comparison means for comparing said signal representative of said on-line balance with a signal representative of said requested value, said first comparison means supplying a first control signal when said on-line balance is equal to or exceeds said requested value, said first comparison means supplying a second control signal when said requested value exceeds said on-line balance;

at least one dispensing machine including means responsive to said data recorded on said card for supplying said signal representative of said customer identification number and a signal representative of said off-line balance, means for manually entering said requested value, means for supplying a signal representative of said requested value, second comparison means for comparing said signal representative of said requested value with said signal representative of said off-line balance, said second comparison means operable in response to said second control signal supplied by said first comparison means, said second comparison means including means for supplying a third control signal when said off-line balance is equal to or exceeds said requested value, delivery means for dispensing said requested value, said delivery means responsive to said first control signal to dispense said requested value, said delivery means additionally responsive to said third control signal to dispense said requested value; and interconnecting means for coupling said signal representative of said customer identification number and said signal representative of said requested value from said dispensing machine to said central processing unit, said interconnecting means additionally coupling said first and second control signal from said central processing unit to said dispensing machine.

10. The value dispensing system of claim 9, wherein said central processing unit further includes subtraction means responsive to said first comparison means for subtracting said requested value from said on-line balance whenever said first control signal is supplied by said first comparison means, said central processing unit further including means for substituting the difference between said on-line balance and said requested value for the on-line balance stored within said storage means.

11. The value dispensing system of claim 9, wherein said dispensing means further includes subtracting means responsive to said second comparison means for subtracting said requested value from said off-line balance when said third control signal is supplied by said second comparison means, said dispensing means further including recording means responsive to said subtraction means for recording the difference between said off-line balance and said requested value on said card in place of said off-line balance and said difference being the off-line balance of said account after the dispensing of said requested value.

12. The value dispensing system of claim 9, wherein said second comparison means is further operable in response to a predetermined signal and said dispensing machine further includes manually operable switch means for supplying said predetermined signal to said second comparison means, said switch means operable to cause said dispensing machine to operate independently of said central processing unit wherein aid maximum value dispensed in any one transaction is limited solely by said off-line balance.

13. The value dispensing system of claim 9, wherein said central processing unit includes means for coupling said signal representative of said on-line balance to said dispensing machine through said interconnecting means, said dispensing machine further including means for supplying humanly perceivable indications of both said on-line balance and said off-line balance.

14. The value dispensing system of claim 9, wherein a predetermined nuber of dispensing machines are remotely located relative to a single central processing unit, each of said dispensing machines coupled to said central processing unit by said interconnecting means.

15. The value dispensing system of claim 9, wherein said account is an account in a banking system and each of said dispensing machines dispenses cash having monetary value equal to said requested value.

* * * * *

UNITED STATES PATENT AND TRADEMARK OFFICE
CERTIFICATE OF CORRECTION

PATENT NO. : 4,011,433
DATED : March 8, 1977
INVENTOR(S) : Tateisi et al.

It is certified that error appears in the above-identified patent and that said Letters Patent are hereby corrected as shown below:

Column 12, line 25, delete the word "aid" and insert therefor --said--.

Column 12, line 36, delete the word "nuber" and insert therefor --number--.

Signed and Sealed this

Seventeenth Day of May 1977

[SEAL]

Attest:

RUTH C. MASON
Attesting Officer

C. MARSHALL DANN
Commissioner of Patents and Trademarks